Oct. 26, 1943. N. E. OGLESBY 2,333,035
COATED ABRASIVE
Original Filed Feb. 6, 1937   2 Sheets-Sheet 1

Inventor
NICHOLAS E. OGLESBY,
By Anderson Daily & Cushman Attorneys

Oct. 26, 1943.   N. E. OGLESBY   2,333,035
COATED ABRASIVE
Original Filed Feb. 6, 1937   2 Sheets-Sheet 2

Inventor
NICHOLAS E. OGLESBY,
By Cushman Darby & Cushman
Attorneys

Patented Oct. 26, 1943

2,333,035

UNITED STATES PATENT OFFICE 2,333,035

COATED ABRASIVE

Nicholas E. Oglesby, Troy, N. Y., assignor to Behr-Manning Corporation, Troy, N. Y., a corporation of Massachusetts Original application February 6, 1937, Serial No. 124,506. Divided and this application November 8, 1939, Serial No. 303,492

18 Claims. (Cl. 51—185)

This invention relates to a laminated backing or support, particularly useful in the art of coated abrasives. By "coated abrasives," I mean sandpaper, emery cloth and the like, which usually comprise a reinforcing layer or support having on one or both sides, an adhesively united abrasive surface of grits. The grits or abrasive particles comprise some suitable material, such as emery, Alundum, flint, garnet, corundum, and silicon carbide, etc., or mixtures thereof.

Particularly the invention includes a novel laminated backing or combination and method of making the same in which an artificial resin is used for combining the layers. Such a support has been found highly desirable in the manufacture of coated abrasives generally, as well as coated abrasives made in accordance with United States Patents 2,184,896 and 2,199,752, wherein a highly viscous synthetic bond is employed for adhering the grits to the backing.

It was discovered that excellent results are obtained by employing a synthetic resin, particularly highly viscous resins, as the adhesive, both for uniting the laminations of the backing and for bonding the grits to the backing surface. The adhesive for combining the backing layers frequently permeates through the top lamination, e. g., cloth, on which the grit surface is formed, while the adhesive for the grits also permeates the layer of cloth. If there is commingling, it is desirable that the respective commingling adhesives have substantially similar attributes, properties and general characteristics to enable them to combine and enhance the strength and resistance to separation of the layers as distinguished from objectionable results due to their being incompatible. In the case of a relatively dense lamination, e. g., vulcanized fibre, there is little or no penetration by the adhesive.

By employing synthetic resins as the binder for the laminations, as well as the bond for the grits, a very strong article having optimum durability is obtained. For example, the coated abrasive of the present invention resists moisture, and does not disintegrate in the presence of temperatures up to 500° F. Moreover, the tensile strength of the bond for the grits, and usually for the laminations, is at least 6000 pounds per square inch and often 8,000 to 14,000 pounds per square inch or higher. Such qualities not only enhance the life of the product, but enlarge its field of utility over any coated abrasives, which to my knowledge have heretofore been made.

In connection with the laminated backing, various and preferably flexible sheet materials may be used for the combination, such as cloth to paper, cloth to vulcanized fibre, cloth to cloth, paper to paper, paper to vulcanized fibre and vulcanized fibre to vulcanized fibre. Paper and vulcanized fibre are examples of waterlaid webs that are suitable for my purpose. The different materials present difficulties in combining and it is an object of this invention to produce a backing or combination in which (1) the effects of differential shrinkage between layers of different materials are overcome, as, for example, in the case of combining cloth and vulcanized fibre or paper, (2) wrinkling is obviated, and (3) blistering and separation of the layers are prevented. In other words, a support having coextensive layers continuously united throughout their opposed surfaces is produced.

For example, when cloth is combined with vulcanized fibre or paper, the cloth usually loses moisture and shrinks more rapidly than the fibre or paper under the influence of elevated temperatures of the resin, the curing and drying temperatures employed, and sometimes under the dehydrating action of the resin. It was discovered that shrinkage due to loss of moisture is partially or completely overcome by giving the cloth, prior to combination, a dehydrating treatment. This preliminary drying of the cloth is preferably controlled by drying the cloth to have a moisture content well below that which is at equilibrium with the existing factory atmospheric conditions.

In general, it should be appreciated that various different flexible webs such as paper, vulcanized fibre, and cloth, expand and contract at different rates and at equilibrium do not show identical dimensional changes when exposed to the same variations in humidity. Furthermore, the dimensional changes of these various webs are not identical for identical changes in moisture contents of the various webs. Also, the shrinkage and expansion characteristics within a given class of flexible webs are not identical as for instance one kind or variation of paper web may expand or contract at an appreciably different rate from a different paper web under identical changes in humidity of the surrounding atmosphere. In the practice of the invention, it is preferred to treat one or more webs that are to enter into the laminated structure so that after the combining operation the various laminae will exhibit more nearly the same expansion-contraction characteristics as for instance when the web is heated to cure the laminating adhesive. While it is usually preferred to shrink, as by removal of moisture, the web or webs showing the greater shrinkage characteristics during the curing of the resin, this purpose may also be accomplished by humidifying and thereby swelling the web or webs showing the lower shrinkage characteristics under conditions such as exist during the curing of the laminating resin.

In the mechanical combining of laminated materials, especially where a flexible lamina, such as cloth, is used, it has always been a problem to prevent wrinkling. Where glutinous and similar quick setting adhesives are used, wrinkling has normally been overcome by feeding a cloth web through a tentering machine to hold the cloth under tension in the cross-direction while at the same time, applying longitudinal tension on the combining machine. When resinous adhesives, in accordance with the present invention are used in the combining operation, it has been found that if the cloth is combined to the paper, fiber or other web with the cloth under tension, there is an aggravation of the shortening of the cloth and consequent formation of blisters and separation of the cloth lamina from the other laminae. It was found that the objectionable effects of having the cloth under tension and also the usual wrinkling encountered where no tension or little tension is used, are overcome by controlling the feed of the cloth web by a feeding mechanism located adjacent to the point where the webs are brought together in such a manner that the cloth web is kept free of wrinkles up to the feeding mechanism and combined with the other web with no substantial tension on the short span between the cloth feeding mechanism and the point of uniting the laminae. By careful regulation of the feeding of the cloth web, or the web having the greater tendency to shrink, which should preferably be the web of which no adhesive has been applied, at a speed slightly in excess of the speed of the other web or webs, it is possible to overcome separation of the laminae due to tension release after the combining operation and at the same time, avoid wrinkling.

It should be understood that various flexible webs have different elasticities and are, therefore, subject to different degrees of stretching or deformation when a constant tension is applied to the various webs. In carrying out the combining process, it is preferred to operate with less tension on the more elastic web whereby the various laminae in the combined structure are stretched more nearly to the same amount whereby there is a more equal tendency to return to the same dimensions after the tension is relieved.

It is an important feature of the present invention that the laminated web as fed to the grit adhesive coating machine and to the grit depositing instrumentality, has the resin in a partially cured adhesive and flexible state, whereby the web may be carried over the usual rolls in various directions through the sandpaper machine and festooned in a drying room without separation of the layers, or destroying the adhesive union. The cure to which the resin is subjected is critical, in that the curing is stopped at a point below that at which the resin exhibits properties of extreme brittleness and while the adhesive retains some flexibility. In this manner, not only are the layers firmly adhered, and the laminated product rendered sufficiently flexible for the subsequent operations, but since a synthetic resin bond for the grits is employed, after the coated abrasive is formed, a single final drying and curing cycle may be carried out to bring out the optimum properties of tensile strength and resistance of both the binder for the layers and for the grits.

It should be appreciated that coated abrasives are often referred to as flexible sheet abrasives. In the case of coated abrasives, known in the trade as waterproof sandpaper, flexibility has been imparted to or retained in the sheet by virtue of the inherent flexibility of the binder. In the case of conventional coated abrasives made with a glutinous binder, it has been the custom to impart flexibility to the coated sheet by a mechanical breaking of the adhesive-abrasive coat. The requirements of flexibility are different for different classes of products, and the breaking of the adhesive has been regulated in accordance with the intended use of the product. Several methods are known in the coated abrasive art for mechanical flexing of sheets made with a relatively inflexible binder such as glue. In one method of flexing, the web is pulled under tension over a bar with its back against the bar edge, the width of the edge of the bar being varied according to the distance desired between breaks, the narrow edge bars giving the closest breaks. Sometimes the web is pulled over a bar in such a way as to produce breaks which are substantially perpendicular to the length direction of the coated web, while in other cases, the breaks are at about an angle of 45° to the length direction of the coated web.

Another method of mechanical flexing of coated abrasives consists of pulling the coated web between a rubber roll and a small steel roller to which pressure is applied to push the web into the rubber and form regular breaks in the adhesive abrasive coating.

As stated before, while the adhesive for holding the grits has high tensile strength above 6,000, usually 8,000 to 14,000 lbs. per square inch or more, and while it is relatively tough, it is sufficiently inflexible and brittle, that is, of the nature to permit mechanical flexing without material injury to the union between the grits and the adhesive or the union between the adhesive and the reinforcing backing. The products made according to this invention may be used without flexing or may be mechanically flexed as above described, according to the nature of the product and its intended use, since the laminated structure is of a nature to permit flexing without separation of the laminae.

The various considerations just recited enable the product to be made in a large yardage and a continuous manner and either stored in rolls, if desired, or continuously carried into the devices for applying the adhesive bond for the grits, as well as for applying the grits.

It is referred herein to the adhering of the layers to each other and to uniting the grits to the surface of the combination back by means of a synthetic resin. By "synthetic resin," is meant phenol or cresol aldehyde condensation products, or phenol or cresol hexamethylene tetramine condensation products, as well as alkyd resins and urea formaldehyde resins, but the resins set forth in the aforesaid applications of Oglesby or blends thereof are employed with equal facility and, in referring to synthetic resin, it is intended to include a wide variety of artificial resins possessing the required bonding properties and resistance. It is preferred that a viscous resin be used as the adhesive. Such resins for purposes of application, may be rendered fluid or more fluid by heating, or by means of a solvent and, after coating, higher viscosity may be developed by cooling or removal of solvent if solvent is used or by partial curing. In this connection, where the bonding coat becomes too viscous or case-hardens prior to combining, the surface zone may be softened and rendered tacky as for example, by means of heat or by means of a solvent or the application of a very fluid resin or thinned resin solution, as set forth in United States Patent 2,199,752.

As heretofore stated, the binder for the layers at the time of grit binder and of grit application is in a semi-cured state and retains some flexibility. After grit application, the coated abrasive may be subjected to a cooling step to harden the respective binders, i. e., the laminating and grit holding binders and preserve the initial favorable disposition of the grits where necessary. The coated abrasive is then led over rolls to a drying room and festooned for giving the resins a further cure. The conditions surrounding the temperatures and time periods of the drying and curing cycle are so controlled that a no time does the viscosity of the adhesive substantially decrease from that which it had at the time of grit application.

As will be appreciated, the use of a highly viscous binder for the layers, one which has high body strength and is strongly adhesive and tacky, prevents separation of the layers or their movement relative to each other, while the use of a highly viscous adhesive bond for the grits assures that in all cases of grit dispersion, the grits will be held in their initial positions and in the subsequent travel of the coated abrasive, these favorable conditions will continue and there will be no flow of the adhesive and grit, such as would destroy the desired spacing and density of the grit surface or allow the adhesive to lose its uniformity of coating.

It is a further feature of this invention, that the grits may be applied to the coating by a dispersion method involving orientation of the particles, so that they adhere to the bond in equally spaced relation with their longer axes perpendicular to the backing. An orientation method is preferred wherein the grits are dispersed through an electrical field, as shown and described in the patents to Elmer C. Schacht, 2,027,307 and 2,027,309, January 7, 1936.

In one form of the invention, dispersion and orientation of the grits constitutes a step, and while various methods may be used, as stated, it is preferred to operate in accordance with the said Schacht patents.

A more detailed description of the invention will now be given in connection with the accompanying drawings, wherein:

Figure 2 is a detailed diagrammatic view of the cloth feeding means of Figure 1;

The apparatus

Figures 1, 4:
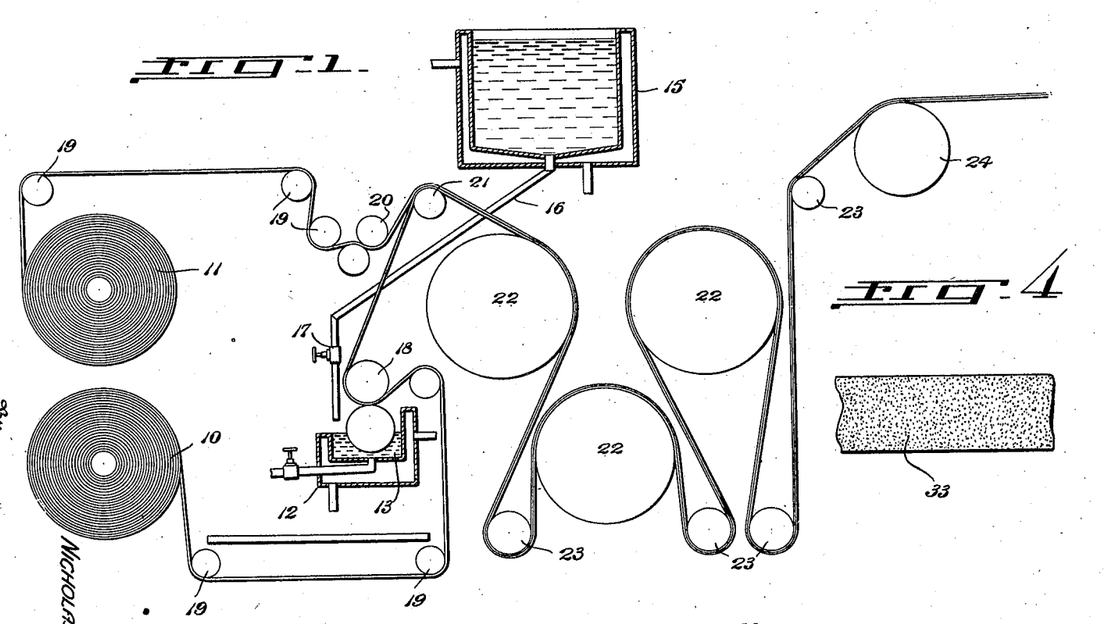
Figure 1 is a diagrammatic view illustrating the combining method and machine employed.
Figure 4 is a top view of the coated abrasive of Figure 3.

Referring to Figure 1, the numeral 10 designates a roll of paper, vulcanized fibre or other similar backing material, associated with a companion roll 11, for example, of cloth or similar fabric which has been properly prepared for the combining operation to form a laminated backing or support for a coated abrasive. It is, of course, understood that various types of layers may be used to form the backing or support and they may be felted as in the case of paper, or woven as where cloth is used. The combination may consist of various laminations as before mentioned, and, while it is preferred to use a two-layer combination, one built up of three or more layers may be formed for certain purposes.

A conventional sandpaper coating adhesive box 12 equipped with a heating and cooling jacket is employed for containing the resinous adhesive 13, which is fed from an adhesive storage means 15, preferably equipped with a conventional agitator and steam or water jacket, whence the adhesive may be heated as desired or cooled with cold water. Communication between the storage means 15 and the adhesive box 12 is established by means of a conduit 16 having a valve 17.

Conventional coating rolls, such as used in the abrasive industry, are shown at 18, the bottom coating roll working in the adhesive box being preferably made of rubber or similar material, while the top roll is usually of steel.

The cloth from roll 11 is carried over suitable idler rolls or guide rolls 19, and passed between a pair of feed rollers 20, which are equipped with an independently controlled variable speed drive of conventional design.

The paper or vulcanized fibre from the roll 10 is fed over idler rolls 19 and between the coating rolls 18, and the cloth and paper are initially combined by being passed over an idler roll 21, whereupon the combination is further compressed and combined by passing over conventional rotating drying cans 22 and associated idler rolls 23. The cans are used either hot or cold, being heated by suitable steam or water attachments, or air, or water cooled. Often, no heating or cooling is desired and the cans simply apply a light mechanical combining pressure to the laminations. The laminated structure is carried through the machine by means of a conventional type of suction drum 24.

Referring to Figure 2, P is a prime mover and may be a suitable variable speed electric motor. A Crocker Wheeler motor, size EF, 675–2025 R. P. M. with a rating of 0.35 H. P. is satisfactory. 25 is a suitable coupling means between the prime mover P and the speed reducer 26. A suitable coupling is the Ajax coupling, size F-1. A suitable speed reducer 26 is the Cleveland speed reducer, type R. T., size 0, ratio 15-1. 27 is a suitable belt or other driving means operating over pulleys 28 and 29. 31 is a spring tension device whereby the rolls 20 are held together at a substantially constant pressure. Corresponding numbers in Figures 1 and 2 refer to the same parts of the apparatus.

The process

In illustration of the invention and, for example, the roll 10 will comprise vulcanized fibre, about 10 mils thick and weighing approximately 200 pounds per paper ream, and the roll 11 will comprise drills cloth suitably prepared, as will be now explained. There is taken, for instance, a 38½" drills cloth with a weight of 2.14 yards per pound made from a 14's warp and a 12's fill yarn with a count of 72x48 and give it a conventional desizing operation, e. g., a Diastofor treatment, followed by a dilute alkali boil, with subsequent washing and neutralization of excess alkali. Prior to combining, the cloth is given a dehydration treatment such that its moisture content is reduced below that point where it is in equilibrium with existing factory atmospheric conditions.

Vulcanized fibre is a term applied to a hard, horny paper-like material which is generally produced by manufacturing paper from cotton rag stock and then subjecting the rag paper to an action known as vulcanizing which consists of an appropriate treatment with sulphuric acid or more commonly with a solution of zinc chloride, whereby the cellulose is more or less gelatinized but generally without complete disintegration of the individual fibres. After the gelatinizing action, the web is washed thoroughly to remove all traces of sulphuric acid or zinc chloride as the case may be, as the presence of even minute quantities of these materials will result in a rapid deterioration of the product as, for example, loss of strength.

The web 10 is led through the rolls 18 and a coating of adhesive of desired thickness is applied, in this case in the neighborhood of 12 pounds per sandpaper ream.

Suitable adhesives or mixtures thereof may be prepared as illustrated in the following examples and these are given purely by way of example and are useful not only as the combining adhesive, but also for forming the adhesive bond for the grits.

*Example I.*—A very viscous resin is prepared by heating together to 100–110° C., while stirring, phenol 100 parts by weight, sodium hydroxide (solid) .86 part by weight, and holding the mass at 100–110° C. for 15 minutes to dissolve the sodium hydroxide. After cooling to 50° C., there is added slowly, while stirring, paraformaldehyde 30 parts by weight.

Thereafter, while stirring, raise the temperature of the mass slowly over about 70–75 minutes to about 120° C. and hold at 100–120° C. for about ½ hour or until a cooled sample is of desired viscosity. Boiling is avoided to prevent the reaction from becoming violent and uncontrollable.

While this resin as prepared is suitable for a number of combining operations or as a grit bond, there are cases in which a less viscous adhesive is desired. In these cases, a suitable viscosity of adhesive may be obtained by blending in the required quantity of a thinner resin prepared as in the following example:

*Example II.*—A less viscous resin is prepared by heating together to 100–110° C., while stirring, phenol, 100 parts by weight, sodium hydroxide (solid) .86 part by weight, and holding the mass at 100–110° C. for 15 minutes to dissolve the sodium hydroxide. After cooling to 50° C., there is added slowly, while stirring, paraformaldehyde 30 parts by weight.

A slight vacuum (about ½" to 1") is applied to the mass and the temperature raised slowly over 1–1¼ hours to 100° C. The vacuum is then raised to 10–15" until the temperature is about 70° C. and this temperature is held under vacuum until a cooled sample shows desired viscosity. The mass is then cooled to 35° C.

At the time of application to either the paper layer for effecting the combination, or to the backing for forming a grit bond, the adhesive should be spreadable to form the necessary coating. The adhesive, as prepared, may have the desired fluidity or this may be induced or developed by heating or by means of a solvent, such as alcohol. The adhesive is in a viscous condition and in the case of a binder for the layers, has been cured to a state where it exerts the desired strong adhesive properties for permanently maintaining the combination, but at the same time has some flexibility and is tacky, i. e., the condensation has not been carried to the brittle stage. Immediately after the laminating operation, the viscosity of the laminating adhesive should be increased, if necessary, as by cooling or evaporation of solvent, so that the adhesive is substantially non-flowable, and possesses high body strength and a jelly-like consistency.

It was found that the resins exemplified above or mixtures thereof, as described, may be satisfactorily coated when applied at temperatures around 150° F. and that they may be subsequently cooled or allowed to cool to increase viscosity.

The uncoated cloth or other web is fed by the feed rolls 20 which, as stated, have a variable speed connection with an independently controlled drive, and the two webs are initially combined by passing together over the roller 21 where the cloth is pressed against the adhesively coated fibre or other web. The lightly combined laminated web then passes over the cans 22 and idler rolls 23, where a light pressure is applied and the two webs are more firmly united, so that they will be adequately held by the adhesive coat through the various subsequent steps of the manufacture of the combination backing and of the coated abrasive.

From the suction drum 24, the laminated structure is delivered as a continuous web to a conventional sandpaper drying room equipped with festoons where heat is applied and the adhesive is cured to the required extent. This curing, as stated, is partial and is critical in that the curing is gradual and is stopped below a point or the stage at which the adhesive will become brittle at factory temperatures and humidities. The laminated web is therefore flexible enough to be readily passed through the several instrumentalities of a sandpaper machine and the drying and curing apparatus without separation or cracking of the layers, or movement of the layers with respect to each other.

*Cloth or web treatment*

As mentioned above, the hygroscopicity of the binder and the heat thereof, and the heating incident to curing, unless control measures be taken, will produce material shrinkage of the cloth without corresponding dimensional shrinkage of the fibre backing and hence the cloth web becomes shorter than the fibre web and large blisters are formed, for example, on the festooned materials within the drying room. Further, there takes place in conventional methods an objectionable separation of the cloth from the fibre layer over large areas especially at the bottoms of the loops in the festoons.

It was discovered that the shrinkage of the cloth is intimately associated with the dehydration or loss of water by the cloth which may be due to any one or all of three causes, namely, (1) the drying action of the heat from the laminating resin; (2) the application of heat to cure the resin; and (3) the ability of the resin to take up moisture from its surroundings. The resins prepared in the manner above described are at least partially dehydrated and are usually able to take up water which aggravates the third possibility. However, these resins being relatively low in moisture content are advantageous in that we have discovered that under certain conditions, excessive water in the resin may cause bubbles or other discontinuities within the resin itself when it is subsequently cured, thereby materially interfering with its adhesive properties.

As a means of overcoming the shrinkage of the cloth due to loss of moisture and resultant formation of blisters and separations in the combination, it was discovered that by drying the cloth to a moisture content well below that which is at equilibrium with the average factory atmospheric conditions, the shrinking action of the hot resin or the elevated curing temperatures is materially reduced. For example, where the feeder rolls 21 are properly operated, it was found that drying the cloth to equilibrium with a temperature of about 55° C. will suffice, although a cloth even drier is desirable in some cases.

A satisfactory means of drying the cloth is to pass it over hot cans such as are generally used in cloth finishing departments, paper mills and the like for drying webs. The cans are preferably heated with steam at a pressure of about 15 lbs. per square inch. The speed of the cloth drying operation can be adjusted to conform with the number of cans used, the greater the number of cans the higher the speed it is possible to use and still secure the required drying. A satisfactory test to determine whether the cloth has been sufficiently dried, is to weigh and then heat a sample of the cloth to 55–60° C., and weigh again. If there is no loss or a slight gain of moisture at 55 to 60° C., it can be assumed that the cloth has been sufficiently dried for the usual operation, but the cloth should be more completely dried in any case where trouble, due to shrinkage, is not overcome by the milder drying treatment.

Feed of cloth or web

The variable speed feed rolls 20 have an independently controlled drive which further aids in the prevention of blisters or separations in the laminated combination and avoids wrinkling. That is, in the prior art of making a combination using various adhesives, i. e., animal glue, it is common practice to use a tentering machine to stretch the cloth in the cross machine direction and to apply tension in the length or machine direction so as to pull the cloth through the machine, hold it level and tightly embed it in the adhesive coat applied to the fibre web. In the practice of the present invention, the stretching of the cloth, as in the prior art, has been found to accentuate and increase the formation of blisters or the separation of the cloth from the fibre in large areas due to the shrinkage of the cloth resulting from tension release. By placing the feeder rolls 20 near to the point where the cloth is combined with the adhesively coated fibre web, that is, close to the roll 21 and the proximate main combining cans and idler rolls 22—23, as illustrated in Figure 1, and by properly operating the independent differential speed drive with which feeder rolls 20 are equipped, it is possible to keep the cloth free from wrinkles. In other words, the cloth is fed at a critical rate of speed which may be described as slack enough or at an infinitesimally greater speed than the fibre web 10 so as to avoid both wrinkling and separations due to release of tension. Since the cloth is not under tension, also as distinguished from prior methods, any subsequent shrinkage that would occur as a result of tension or stretching during the combining is negligible and furthermore, shrinkage is accommodated whenever it happens by the residual stretch left in the cloth, and without the formation of blisters or large areas in which the cloth has been separated from the adhesively coated fiber or paper.

The stretch and various properties of cloth, of course, are not constant, but in any event the combination must be free from wrinkles, and while it is not possible to give definite instructions for the differential feed between the cloth web 11 and the vulcanized fibre web 10, in general it may be stated that the process is carried out by feeding the cloth as slack as possible without the formation of wrinkles. Since wrinkles will occur, if the cloth is fed too slack, to find the correct differential, it is only necessary to speed up the cloth until wrinkles begin to appear and then slow down gradually until the wrinkles disappear.

Curing and drying of the laminated web

The laminated web prepared as described may be used as a backing for synthetic resin bonded coated abrasives, but before applying the binder-grit coating, it is preferred to carry out a critical curing and drying cycle. While in some cases the laminating adhesive is completely cured before coating the web with the grit bonding adhesive, this is not preferred and, in certain instances, may not be economical. If the laminating adhesive is cured beyond a certain critical point with the type of adhesive used by way of illustration, it becomes necessary to completely cure the adhesive. I have discovered that at a certain stage of under-cure the resinous laminating adhesive forms a satisfactory strong bond for the layers and is sufficiently flexible to permit coating and handling in the usual sandpaper plant. If, however, the cure is taken too far towards maturity, there is an intermediate stage in which the laminating adhesive is weak, tender and brittle. With the resin in this state, adhesion between the laminae is poor and the layers are easily separated, e. g., the usual subsequent handling of the web will result in splitting and ruining the laminated web. If the heating is carried beyond this point and a sufficiently high temperature is applied for a long enough time, there is a complete curing of the bond and it becomes strong and tough enough to withstand the usual handling operation.

Therefore, the laminating adhesive is cured to raise its flow temperature so that there will be no separation of the laminae at the temperatures and under the conditions required to cure the binder for the grits which is subsequently applied to the laminated backing.

When, as previously disclosed, the combined web has been delivered to a conventional sandpaper drying room, a suitable drying and curing cycle for the combination, prior to taking it from the racks in the form of rolls for coating with adhesive and grits, is obtained by subjecting the web to temperatures of 100° F. for 2 hours; 110° F. for 2 hours; 120° F. for 5 hours; and 130° F. for 3 hours.

After the foregoing partial curing cycle, the combination should be cooled, preferably to a temperature of not in excess of 80° F. It may then be taken down in the usual form of rolls or jumbos and coated as soon as convenient thereafter, since there is some tendency for the resin with this degree of cure to soak through the cloth on standing for prolonged periods of time and cause the rolls to stick so that the web cannot be readily unrolled in the abrasive coating operation. This condition can be overcome by maintaining the rolls at a sufficiently reduced temperature to render the adhesive non-tacky, and the rolls may then be stored and used as desired.

The combination or web prepared by the process just described is flexible and the layers are coextensive and firmly united. The web is now ready for the coating operation with binder and grits as described in the aforesaid copending applications of Oglesby. As stated, the binder for the layers is in a partially cured state and the curing of this binder, as well as the binder for the grits, is carried out in accordance with the said applications through a critical drying and curing cycle.

Coating web with binder and grits

As stated, the web may be continuously passed from the coating and combining machine of Figure 1 through a drying and curing chamber and then to the usual sandpaper machine. On the other hand, after the drying and curing step, the web may be rolled and used as subsequently required.

The coating for bonding the grits to the backing or support will comprise one of the resins or a mixture thereof, as above described, or one of the resins set forth in copending applications of Oglesby. In fact, as stated, any suitable resin having the required viscosity, adhesive and finally cured characteristics, of these resins may be used.

The web is coated with a synthetic resin bond in a spreadable state and may have the desired viscosity, or this may be developed by heating, cooling, or evaporation of a solvent, such as alcohol, which is sometimes used to render the resins spreadable. Prior to grit application the binder for the grits should have the highest possible viscosity consistent with properly wetting and picking up the desired weight of grits. If the surface of the bond has cooled, a highly adhesive wetting zone may be created as described in United States Patent No. 2,199,752.

In some cases, I apply the sand or other grits in heated condition, usually at temperatures of about 150° to 160° F.

Any satisfactory means of applying the grits may be employed, although I preferably use a dispersion method. In this connection, the preferred procedure which constitutes a step in one form of the invention resides in dispersing the grits in oriented relation upon the adhesive bond. Orientation of the grits is recognized as producing the most efficient abrasive surface for many purposes, in that the grits are evenly spaced and are presented with their major axes extending perpendicular to the backing. The use of a viscous adhesive of the character described above enables this initial orientation to be preserved and following grit application, if necessary, the web can be cooled and/or solvent removed to harden or freeze the grits in their initially dispersed positions and while travelling to the drying and curing chambers. It is important that a highly viscous binder be employed to hold the grits in order that the grits may be held in their initially applied positions and in order that there may be no flow of the binder over the coated web during a critically controlled curing cycle which is carried out to harden the binder and develop toughness and high tensile strength.

In connection with the dispersion methods involving orientation, I prefer to use an electrical field, preferably an electrostatic field, as described in the aforesaid patents to Elmer C. Schacht.

It was pointed out above that by having resins which are compatible with each other, i. e., combinable, that a stronger adhesion is obtained and a more resistive article is possible which possesses a longer abrading life. In addition, since the binders for the layers and for the grits possess very similar attributes, and are each in a partially cured state, a single critical curing and drying cycle may be carried out which will develop the optimum tensile strength, infusibility and insolubility of the resin and at the same time the viscosity of the resin will at no time be reduced to a point where the resin layers will separate or move with respect to each other or the grits will flow or turn over due to thinning or weakening of the bond.

A critical drying cycle, such as is required in this process, extends over a relatively long period of time, and may include a number of different temperatures. Over such a period of time a relatively slow flow of coating or a slow motion of grains within the coating may permit displacement of the adhesive coating or of the abrasive grains within the coating and such flow or dislocation of grains may not be readily detectable during a short period of time, with the result that the product may be damaged materially before such a slow process of damage becomes evident and can be corrected. Where the product is damaged by such a slow process, such damage results from the existence of conditions wherein the viscosity of the adhesive is too low. Since the drying cycle is critical, we find it desirable to apply a test to determine the critical viscosity of the adhesive bond during the process of curing especially where such data is not available from previous runs with the same adhesive under identical or less favorable conditions. The product is delivered to the initial drying conditions as herein described without any visible substantial flow of adhesive or dislocation of the grits from their initially applied positions, and the initial drying conditions are so adjusted that the average motion of the grains from the tops of a vertical web towards the bottom will not exceed six one hundredths of an inch in 15 minutes. It has been determined experimentally that at a given set of conditions, that is as for example, at constant temperature and humidity, the greater part of the flow of the coating towards the bottoms of the loops and loss of orientation due to the grains turning over, occurs within the first 15 minutes. It has further been determined, that an average motion of grains from the tops towards the bottoms of the festoons of not to exceed six one hundredths of an inch in 15 minutes, insures the maintenance of a large part of the initially attained orientation of grains.

It should be appreciated that it is desirable to keep the loss of orientation and the flow of the coating at a minimum and that in general in the practice of our invention the average motion of the grains may be considerably less than six one hundredths of an inch for the first 15 minutes. Since, however, it is desirable, for reasons of economy, to cure the coated abrasive as rapidly as possible, it sometimes becomes advisable to compromise between the rate of flow permitted and the rate of curing found commercially economical.

So long as the temperature is not higher than can be endured by the operator, the motion of grains from the tops towards the bottoms of the festoons and the loss of orientation may be conveniently determined with suitable supports, a suitable microscope, suitable illumination and a fixed reference scale, both the scale and the grains being observed through the microscope. Many methods of making the required measurements will occur to those skilled in the art. In case the temperature is above that which can be endured by the operator, an electric oven equipped with a clear glass front and with a temperature control may be conveniently used. By use of a suitable microscope, scale and proper illumination, the sample may be viewed through the front glass of the oven. A sizable sample, as for instance, 5" x 3", is placed in the oven as by hanging from a support so that the abrasive-adhesive coating is visible through the glass front of the oven. Attention is fixed upon a few representative grains within the field of vision, and during a 15 minute period of observation there should be no material loss of orientation and the average motion of the grains towards the bottom of the sample should not exceed six one hundredths of an inch.

For the initial test to determine possible loss of orientation or flow of the coating, any reasonable but constant conditions may be taken. If the flow of the coating during the test period is too great, conditions should be brought about which will increase the viscosity of the adhesive coating. If there is little or no motion, conditions may be brought about which would decrease the viscosity of the adhesive, as for instance, an increase in temperature which would increase the rate of cure of the resin. By the use of this test it is possible to determine the conditions of cure that may be permitted without substantial loss of orientation or dislocation of the grains from their initially applied positions, as for instance because of flow of the adhesive coating over the backing which may sometimes occur as for instance in case of surface hardening of the adhesive even though there is not an excess loss of orientation. After the correct initial drying conditions are determined, these conditions may be maintained for any desired period of time without material flow of the adhesive or loss of orientation of the grains. The rate of cure depends upon the resinous adhesive used and the initial temperature which it has been found feasible to use. After partial curing at the initial conditions, it is usually desirable to increase the temperature to increase the rate of cure. Before raising the curing temperature or otherwise bringing about conditions that might lower the viscosity of the adhesive, a test to determine the extent of flow or loss of orientation at the new conditions should be applied. It should be appreciated that repeated increases in temperature with a flow of somewhat less than six one hundredths of an inch would eventually damage the coating to a material degree. For reasons of economy, it is usually advisable to use the highest temperature possible for the initial curing conditions and then raise the temperature gradually so that the flow of the resin and loss of orientation will be negligible with succeeding increments of temperature. In running a test to determine the temperature increment that is permissible without material injury to the coating, it is advisable to keep the average motion of the grains from the tops toward the bottoms of the festoons at a rate of not to exceed one one hundredth of an inch for the first 15 minute interval at the new curing conditions. In practice, it will be found that after relatively few temperature increments, the rate of cure will have been hastened to a point that a commercial rate of cure will be feasible without having any measurable flow of the coating or loss of orientation with succeeding temperature increments.

The test heretofore described for controlling the critical drying cycle by measuring the average motion of grains away from the top and towards the bottom of a substantially vertically hanging abrasively coated strip is also useful in controlling the critical viscosity of the adhesive used to trap the grains in the coating operation. If the average motion of the grains from the top towards the bottom of the vertically suspended strip exceeds six one hundredths of an inch at the lowest commercially feasible initial curing cycle, the viscosity of the adhesive used to trap the grains must be increased to a point that will decrease the flow at the initial curing conditions to or below six one hundredths of an inch for the first 15 minutes. Furthermore, where any equipment condition wherein the web is brought into a substantially vertical position for an appreciable interval of time between the sand application and the drying chamber exists, the average motion of the grains from the tops towards the bottoms of the suspended loops or other forms of suspended webs must be kept at a rate not to exceed six one hundredths of an inch for any 15 minute interval of time. If the average motion of the grain is greater than six one hundredths of an inch as measured by this test, the viscosity of the adhesive at the time of trapping the grains must be increased to bring the flow down to or below this value, or the viscosity of the adhesive must be rapidly increased immediately after the grains are trapped as for instance by cooling or by solvent removal.

Cloth and vulcanized fiber laminated with resinous adhesive, as given by way of illustration, is a suitable backing for many forms of coated abrasive, as for example, #24 Alundum abrasive coatings. #24 Alundum is a heavy grit and hence, subject to flow and dislocation of both grains and adhesive after coating. For this reason, the maintenance of the bond at a critically controlled viscosity at the time of grit application and thereafter and the use of a critical drying and curing cycle is essential for the production of a uniform high quality product.

For the laminated cloth and vulcanized fiber backing and #24 Alundum abrasive grains, a suitable adhesive for the making coat, or the coat which is used to trap the abrasive grains, is described in resin Example I. A suitable temperature for application of the make coat of adhesive is 150 to 160° F. and the adhesive is brought to this temperature prior to application to the backing. After a suitable quantity of the making adhesive, in this case about 22 pounds of adhesive per sandpaper ream, has been applied to the backing, the viscosity of the adhesive is increased by further partial curing of the resin, a drop in temperature or loss of solvent, i. e., moisture, or both before the abrasive grits are applied. The grit binder at time of grit application should have the highest viscosity consistent with proper wetting and trapping of the desired weight of grain. The abrasive grits in this case may be applied by any conventional coated abrasive sand feeding mechanism and are preferably applied warm, i. e., at a temperature of about 150° F. The process and apparatus are described in detail in United States Patent No. 2,184,896. After the abrasive grains have been applied, the viscosity of the binder is increased and the web is moved by conventional means to a sandpaper drying room where it is festooned and heat is applied to advance the cure of the resinous bonds.

By way of illustration, a satisfactory drying and curing cycle for this particular grit number and laminated backing has been found to be 105° F. for 2 hours, 110° F. for 1¾ hours, 115° F. for 2 hours, 120° F. for 2 hours, 125° F. for 2 hours and 130° F. for 4 hours. The goods should then be cooled to a temperature of around 70 or 80° F., to render the adhesive less tacky and are then taken down in jumbo roll form or other conventional ways.

The rolls are returned and mounted on a suitable bundle stand or other means in front of a conventional coated abrasive sizing machine. The sizing resin is prepared in a conventional coated abrasive adhesive kettle, and run to the sizing trough of the sizing machine. A satisfactory temperature for application of the sizing adhesive used in this case is 140–150° F.

A satisfactory adhesive for the sizing operation may be prepared by taking 60 parts by weight of the viscous resin prepared as illustrated in Example I and mixing with 40 parts by weight of the less viscous resin illustrated in Example II, but the viscosity may be varied by varying the proportions of Example I and Example II. For many applications a satisfactory weight of the sizing material to be applied is 27 pounds per sandpaper ream. After the sizing coat has been applied, as described with such an adhesive on conventional sandpaper equipment, the sand sized web is then delivered by the usual means to a sandpaper drying room where it is festooned and where a heat cycle is applied. This cycle is critical to preserve orientations, the sized goods, as explained, being subject to flow with consequent disclocation of the adhesive and the abrasive grains. In the present illustration, a satisfactory drying cycle within the drying room is as follows: 100° F.—five hours; 110° F.—five and one-quarter hours; 115° F.—four and one-half hours; 120° F.—five hours; 125° F.—five and one-quarter hours; and 130° F.—ten and one-half hours. After this drying cycle has been completed, the goods should be cooled to a temperature of around 95° F. to reduce the tackiness of the adhesive so that the goods can be taken down in the form of rolls. Excessive cooling should be avoided as otherwise the goods will become too brittle for satisfactory taking down and winding up in rolls.

The goods, taken from the sandpaper drying room in the form of rolls, are then cut into satisfactory lengths or strips for a subsequent drying operation to finally cure the resin and develop maximum tensile strength. It has been found that a drying cycle of any commercially economical duration at relatively low temperatures will not produce the final cure of this resin which is required for maximum cutting efficiency and that the cut of the coated material is greatly increased by a high temperature drying cycle described hereafter, which develops the toughness, hardness and tensile strength of the binder.

The curing cycle given for the present example is based upon experience and has been found satisfactory for the exact resins used by way of illustration, where said resins are used exactly as specified. It should be understood that the critical drying and curing cycle is at all times controlled by the test heretofore described. It will be appreciated that it is a fundamental condition in increasing the temperature during the curing cycle that at all times the rate at which the viscosity of the resin is increased by the curing reaction must be equal to or greater than the rate of decrease in viscosity brought about by progressive increases in temperature.

The strips cut from the rolls of coated goods are conveniently cured to the final condition by placing them on suitably arranged shelves within a baking oven which can be regulated within critical limits to obtain the desired temperatures and temperature control. A satisfactory final drying cycle for the strips is as follows: eight hours—70° C.; eight hours—80° C.; then gradually raise the temperature to 100° C. so that a temperature of 100° C. is reached within one hour. Hold at 100° C. for one hour. Raise during the next hour to a temperature of 120° C. and hold at 120° C. for one hour. During the next hour raise gradually to 140° C. and then hold at 140° C. for one hour. During the next hour raise gradually to 150° C. and then hold for three and one-half hours. Thereafter the heat is turned off, the oven is opened, and the strips are allowed to cool.

The strips are then removed, and are cut into conventional belts, sheets, disc-shapes or any other form that it is desired to produce as an abrasive article.

It was discovered that a combination made and cured as described can be subjected to the additional curing operation after abrasive coating without the laminating adhesive reaching that extremely tender condition which would make it difficult to handle and remove the coated material from the racks without excessive waste. The tender condition described does not result in any damage where this stage is passed through in the drying of strips on shelves in a flat condition as in the aforesaid drying and curing cycle. On the contrary, if the laminating adhesive is preliminarily cured too far beyond the cure indicated by the drying cycle herein described, it has been found that the laminating adhesive will reach the tender condition in the coated abrasive drying room and that it will be difficult, if not impossible, to remove the abrasively coated web from the drying racks without considerable waste.

It will also be appreciated that with certain modifications of the resin used by way of illustration, as for instance, further curing in the process of resin manufacture and thinning of the resin with alcohol, it is possible to dispense with or shorten the time of partial cure used with that resin, the increased viscosity required being obtained partially or altogether by evaporation of the solvent which may be accomplished at ordinary room temperatures as will be appreciated by those skilled in the art.

Grit #24 Alundum is a heavy grain and the product made with this grit, as described, is generally used for heavy sanding or grinding operations. In the case of the finer grit numbers, less making coat of adhesive is required and a lower viscosity of adhesive is used. Different viscosities for various grit sizes may be prepared by using suitable proportions of viscous resin Example I and less viscous resin Example II. For many uses, a less rigid backing than that of the laminated vulcanized fiber and cloth, given by way of illustration, is desired. In such cases, there is used laminations of lighter weight cloth and paper, such as print cloth and 130 pound cylinder paper, or other suitable laminations.

The article

The coated abrasive has a laminated reinforcing backing in which the laminae are united continuously throughout, the layers being coextensive and tightly bound together throughout their opposed areas by a layer, usually a thin layer of resinous adhesive, such as that used by way of illustration or other suitable resinous adhesive.

The adhesive for the layers and for the grits are preferably insoluble and infusible, the adhesive for the grits resisting temperatures up to 500° F. The curing operation is carried out to develop the maximum tensile strength and toughness of the adhesive used to hold the grits. The binder for our grits ordinarily has a tensile strength in excess of 6,000 pounds per square inch and in most cases has a tensile strength of 8,000 to 14,000 pounds or more. The resinous adhesives used to hold the grits are hard, tough and relatively inflexible but a more flexible adhesive than the grit holding adhesive may be used in some cases to advantage for the laminating adhesive.

In the case of our laminated backing, there is little penetration of the resinous adhesive into the paper or vulcanized fiber laminae but there is considerable penetration of the cloth lamina used by way of illustration by both the adhesive used to join the laminae and the adhesive used to bond the grits. In many cases, there is a commingling of the laminating adhesive and the grit holding adhesive within the cloth lamina. Penetration of the grit holding adhesive into the cloth insures rigid bonding of the grits to the laminated backing. Since there is no substantial penetration of the paper or vulcanized fiber by the resinous adhesives, there is no embrittling of these materials due to impregnation.

For many products, the grits are preferably dispersed in oriented relation and their initial favorable positions of equal spacing with the longer axes perpendicular to the backing is preserved. In some cases, orientation is less important than a dense coating and the grits are applied by any convenient means and pressed into the adhesive. In this case, an excess of abrasive grains is applied to the adhesively coated backing and the applied pressure is against the excess grains. For this reason, a substantial number of the grits will be oriented with their longer axes at an angle of 45 to 90° with the reinforcing backing. Thus, a substantial proportion of the grains have their sharp points or edges free to engage the work. A substantial percentage of the abrasive grains have from 1/3 to 1/2 or more of their volumes exposed above the average level of the adhesive binder.

In any case, the grits are tenaciously held to the backing by the bond in the manner required which is governed to some extent by the nature of the work for which the product is intended, as for example, a metal working operation requires more rigid bonding of the grits than an operation such as sanding of leather.

The coated abrasive possesses long life and the field of usefulness is widely enlarged over that of conventional coated abrasive products.

Figure 3:
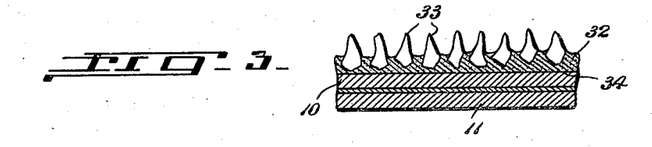
Figure 3 is a sectional view of a coated abrasive made in accordance with this invention.

Referring to Figures 3 and 4, there is illustrated the completed coated abrasive. The bonding coat for the grits is indicated at 32 and the grits at 33. It will be noted that there is a thin layer of resinous adhesive 34 between the bottoms of the grains and the adjacent lamina.

Figures 4, 5, 6:
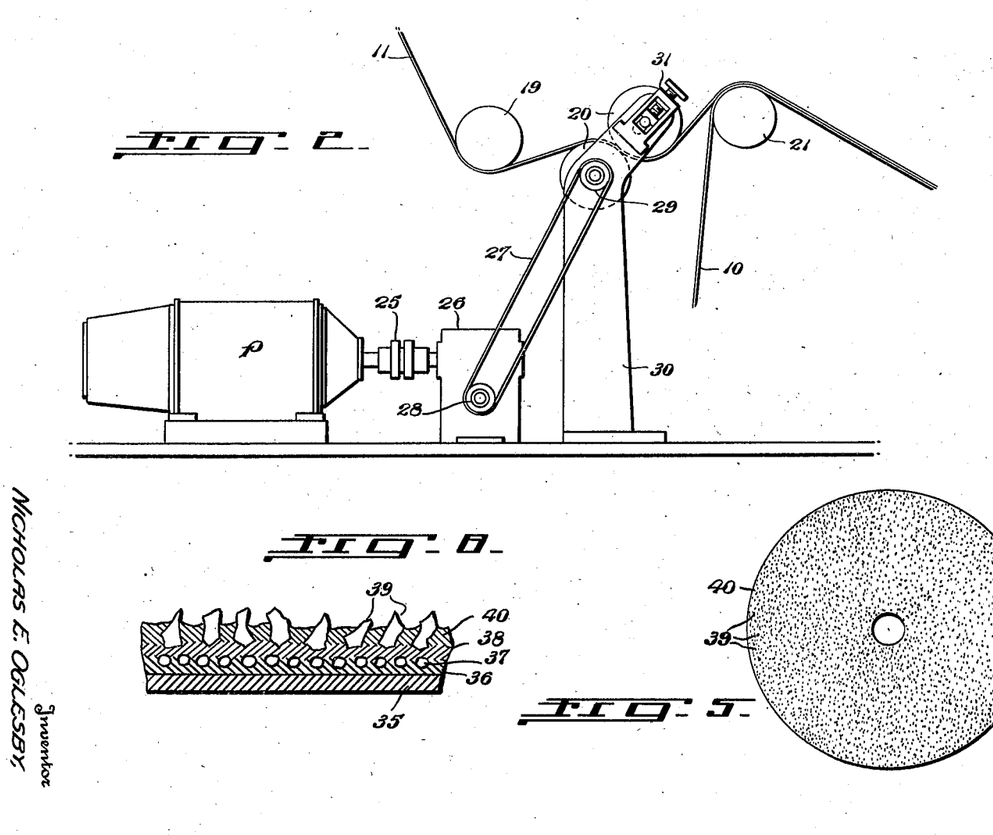
Figure 5 is a plan view of a coated abrasive in the form of a disc.
Figure 6 is a fragmentary enlarged section of the coated abrasive shown in Figure 5.

In Figures 5 and 6 I have illustrated a disc prepared in accordance with the present invention. The numeral 35 indicates a layer of a waterlaid web as, for instance, vulcanized fibre united by a layer of resin 36 to a cloth layer 37. The making coat of resinous adhesive is indicated at 38 for anchoring the abrasive grains 39 to the cloth. The numeral 40 indicates a layer of resinous sizing adhesive applied over the grains and making coat. Referring to Figure 7, it is intended to show the resinous adhesive penetrating the cloth layer 37 and surrounding the threads and filling the voids between the same.

While it is referred herein to the fibrous material or felted web, e. g., the paper as being coated, and the cloth or other fabric as being uncoated, it will be understood that such conditions may be reversed or both webs may have a relatively thin coating of the adhesive.

While it is indicated that the same resinous adhesive may be used for the laminations as for the grits, it will be appreciated that different types of resins may be employed. For example, an alkyd resin may be used for combining the laminations while a phenolformaldehyde resin may be used for combining the grits.

The terms "viscous" and "viscosity" are used in this specification to denote a property of adhesive which resists flow. It is recognized that our process involves at different stages, matter in a state of viscous flow, matter in a state of plastic flow and matter in a state without flow. For the purpose of this specification a resin may be so viscous or have so high a viscosity that it has an infinitesimal rate of flow or even no flow, and a viscous adhesive may be a liquid, a jelly or a solid which will be considered as matter of different degrees of viscosity. It should be appreciated that the present specification deals particularly with films of adhesive as used in coated abrasives and that the flow characteristics of the resin are dependent upon the film thickness as well as the viscosity of the adhesive. Furthermore, the flow characteristics of the film are influenced by the adhesive forces between the backing and the adhesive on the one hand, and between the grains and the adhesive on the other hand. Flow characteristics also depend to some extent upon the surface tension of the film. In the use of any specific adhesive the viscosity is adjusted to obtain the final desired flow characteristics of the resin and limited motion of the grains within the adhesive, irrespective of other influences which are properties of the specific adhesive used, the backing used and the abrasive grains used. This means that in any case after grit application, the viscosity of the particular adhesive used should under the conditions of use be great enough to prevent substantial flow of the adhesive coating or substantial dislocation of the grits from their initially applied positions.

While I have described the laminated structure of this invention as particularly useful as a backing for coated abrasives, it is to be understood that the article, the method of its manufacture and the apparatus are useful in many other applications.

It will thus be seen that there has been provided by this invention an article and a method in which the various objects hereinabove set forth together with many thoroughly practical advantages are successfully achieved.

Referring to Figure 1, this invention is illustrated by showing a roll of fabric 11 which, if required, has previously been treated to shrink or expand the same as a separate operation after which the web is rolled up and located as shown at 11, Figure 1, for the combining operation. It is to be understood that instead of carrying out the shrinking or expanding treatment as a separate operation, there may be located an expanding or a shrinking means as, for instance, a humidifying chamber or drying cans heated by steam, between roll 11 and the independent feed rolls 20, whereby the web is expanded or shrunk and combined continuously in a single operation.

As various possible embodiments might be made of the mechanical features of the above invention and as the art herein described might be varied in various parts, all without departing from the scope of the invention, it is to be understood that all matter hereinbefore set forth is to be interpreted as illustrative and not in a limiting sense.

The present application is a division of the copending application, Serial No. 124,506, filed February 6, 1937, in the names of Nicholas E. Oglesby, Charles F. Reilly, and Victor W. Gilbert.

I claim:

1. A flexible abrasive article comprising a composite backing consisting of a cellulosic sheet, a fabric sheet adhesively attached to one face of said cellulosic sheet, and a heat-hardened resin intermingled with the fibers of said fabric in a quantity sufficient to provide the same with a relatively brittle characteristic and a layer of abrasive particles adhesively attached to the face of said fabric.

2. A flexible abrasive article comprising a composite backing consisting of a hydrated cellulose sheet, a fabric sheet adhesively attached to one face of said cellulose sheet, and a heat-hardened resin filling the interstices of said fabric sheet in a quantity sufficient to provide the fabric component of said backing with a relatively rigid brittle characteristic and a layer of abrasive particles adhesively attached to the face of said fabric.

3. A flexible abrasive article comprising a composite backing consisting of a vulcanized fiber sheet, a fabric sheet adhesively attached to one face of said fiber sheet, and a heat-hardened resin intermingled with the threads of said fabric and filling the interstices thereof in a quantity sufficient to provide the fabric with a shearable characteristic and a layer of abrasive particles attached to the fabric face of said backing.

4. A flexible abrasive comprising a composite backing consisting of a vulcanized fiber disc, a textile fabric disc adhesively attached to one face of said fiber disc, a heat-hardened phenol-aldehyde condensation product resin surrounding the threads and filling the voids of said textile fabric to reinforce the fabric and render the same brittle whereby the same will shear uniformly when the peripheral edge thereof is applied to the work surface and a layer of abrasive particles attached to the fabric face of said backing.

5. A coated abrasive having a backing composed of laminations of paper-like material and fabric united by a synthetic heat hardened resinous adhesive, and a surface layer of grits united to the backing by a synthetic resinous adhesive of high tensile strength substantially above 6000 pounds per square inch, said adhesives being compatible and combining through penetration of one of said layers to form a substantially homogeneous bond.

6. A coated abrasive having a backing composed of laminations united by a heat hardened synthetic resinous adhesive, a layer of grit bonded thereto by a layer of synthetic resin resistant to temperatures up to substantially 500° F. and insoluble in water and organic solvents, the grains of the grit layer extending above the average layer of the resin layer, said resin bond being hard, rigidly holding the grains in place and having a high tensile strength above 6000 pounds per square inch.

7. The method of making a laminated structure with a synthetic heat hardenable resinous adhesive comprising pretreating at least one lamina to prevent differential shrinking and separation of the laminae during curing of the resin.

8. The method of making a laminated backing for coated abrasives, at least one ply of which is cloth, comprising preshrinking the cloth by removing a substantial proportion of its moisture and while said cloth ply is in such condition, adhesively uniting the same to another ply to form a laminated web free from wrinkles, blisters and ply separations.

9. The method of laminating laminae having different shrinkage characteristics when heated in contact with a laminating heat hardenable synthetic resinous adhesive comprising removing a substantial amount of water from at least one lamina whereby separation of the laminae during the curing of the resin is prevented.

10. The method of making a laminated structure, one ply of which possesses a characteristic of greater contraction than another in the presence of heating to set the adhesive employed for uniting the plies, which comprises treating the ply having the characteristic of greater contraction so that it will come into dimensional equilibrium at the same rate as the other ply when the two are combined and the adhesive is at least partially set, coating one of said plies with the adhesive, combining the plies, and heating to at least partially set the adhesive.

11. The method of making a laminated structure, one ply of which possesses a characteristic of greater contraction than another in the presence of heating to set the adhesive employed for uniting the plies, which comprises preshrinking the ply having the characteristic of greater contraction so that it will come into dimensional equilibrium at the same rate as the other ply when the two are combined and the adhesive is at least partially set, coating one of said plies with the adhesive, combining the plies, and heating to at least partially set the adhesive.

12. The method of making a laminated structure, one ply of which possesses a characteristic of greater contraction than another in the presence of heating to set the adhesive employed for uniting the plies, which comprises swelling the ply having the characteristic of lower contraction so that it will come into dimensional equilibrium at the same rate as the other ply when the two are combined and the adhesive is at least partially set, coating one of said plies with the adhesive, combining the plies, and heating to at least partially set the adhesive.

13. A backing for coated abrasives comprising at least two plies of flexible cellulosic material which are held together by a heat-hardened synthetic resinous adhesive bond, said heat-hardened resin being, when fully cured, relatively hard, relatively heat-resistant, water-resistant and having, in film form, when fully cured, a tensile strength of substantially above 6,000 pounds per square inch, one of said plies being a waterlaid web which is substantially unpenetrated by and unmodified by the said synthetic resin and another of said plies being cloth, which is penetrated by and substantially modified by said heat-hardened synthetic resinous adhesive bond, said backing being of sufficient flexibility to permit handling on coated abrasive equipment without delamination or breaking.

14. A coated abrasive comprising a backing consisting of at least two plies of flexible cellulosic material which are held together by a heat-hardened synthetic resinous adhesive bond, said heat-hardened resin being, when fully cured, relatively hard, relatively heat-resistant, water-resistant and having, in film form, when fully cured, a tensile strength of substantially above 6,000 pounds per square inch, at least one of the plies of said backing consisting of cloth which is penetrated by said heat-hardened synthetic resinous combining adhesive bond, said cloth ply of said backing having superimposed thereon, a coating of abrasive grains attached to said cloth ply by a hardened, synthetic resinous adhesive abrasive bond, said resinous adhesive abrasive bond having a tensile strength of substantially above 6,000 pounds per square inch and being of a nature to form a strong adhesive bond with said cloth ply penetrated by said combining resinous adhesive.

15. A coated abrasive having a backing comprising laminations of a waterlaid web and a web of woven fabric united by a synthetic resinous laminating adhesive, said synthetic resinous laminating adhesive being a tenacious bond between the plies, and being of a nature to have, when cured in film form, a tensile strength of substantially above 6,000 pounds per square inch, and a surface layer of abrasive grains united to the fabric layer of the backing with a synthetic resinous abrasive binder, said laminating resinous adhesive and said abrasive binder resinous adhesive being compatible and combining, through penetration of the said fabric layer, to form a substantially homogeneous bond, said synthetic resinous abrasive binder being relatively hard, relatively heat-resistant, water-resistant and being of a nature that, when cured in film form, it has a tensile strength of substantially above 6,000 pounds per square inch.

16. A coated abrasive having a backing consisting of at least two plies, one of said plies being penetrated by and modified by a filling material comprising synthetic resin, one side of said ply containing said filling material being firmly united to another ply by means of a laminating adhesive bond which is water-resistant and relatively heat-resistant, the other side of said ply containing said filling material having a coating of abrasive grains tenaciously anchored thereto by a synthetic resinous adhesive abrasive bond, said resinous adhesive abrasive bond being relatively hard, relatively heat-resistant, water-resistant and being of a nature that when cured in film form it has a tensile strength of substantially above 6,000 pounds per square inch.

17. The method of making a laminated backing for coated abrasives, at least one ply of which is a flexible waterlaid web and at least one ply of which is cloth, comprising removing from the cloth a substantial proportion of its free moisture content and while said cloth is in such a condition, adhesively uniting the same to a ply of said waterlaid web with a synthetic resinous adhesive and setting the said adhesive, said synthetic resinous adhesive being viscous and tacky as used to combine the said plies and forming, when cured, a tenacious bond between the plies, the said synthetic resinous adhesive having, when fully cured, a high tensile strength of substantially above 6,000 pounds per square inch.

18. The method of making a laminated backing for coated abrasives at least one ply of which is cloth, comprising combining a cloth web with another flexible cellulosic web by means of a synthetic resinous adhesive, thereby to form a smooth web of laminated backing and curing the said synthetic resinous combining adhesive, the said combining adhesive penetrating the cloth substantially and forming a strong union between the cloth and another ply of the laminated backing and being of such a nature that when cured in film form it has a high tensile strength of substantially above 6,000 pounds per square inch.

NICHOLAS E. OGLESBY.

CERTIFICATE OF CORRECTION.

Patent No. 2,333,035.    October 26, 1943.

NICHOLAS E. OGLESBY.

It is hereby certified that error appears in the printed specification of the above numbered patent requiring correction as follows: Page 1, first column, line 19, after "synthetic" insert --resin--; page 2, first column, line 41, for "of" read --to--; page 3, first column, line 27, for "a" read --at--; and that the said Letters Patent should be read with this correction therein that the same may conform to the record of the case in the Patent Office.

Signed and sealed this 25th day of January, A. D. 1944.

Henry Van Arsdale,
(Seal)    Acting Commissioner of Patents.